United States Patent
Hartman et al.

(10) Patent No.: US 8,817,742 B2
(45) Date of Patent: Aug. 26, 2014

(54) OVERLAY HANDOVER IN A BROADBAND WIRELESS NETWORK

(75) Inventors: Susan Hartman, Hillsboro, OR (US); Xiangying Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 317 days.

(21) Appl. No.: 12/498,507

(22) Filed: Jul. 7, 2009

(65) Prior Publication Data

US 2010/0008325 A1    Jan. 14, 2010

Related U.S. Application Data

(60) Provisional application No. 61/134,188, filed on Jul. 7, 2008.

(51) Int. Cl.
*H04W 4/00* (2009.01)
*H04J 1/00* (2006.01)
*H04W 36/00* (2009.01)
*H04W 72/00* (2009.01)
*H04B 7/00* (2006.01)

(52) U.S. Cl.
USPC ........... 370/331; 370/343; 455/436; 455/438; 455/443; 455/452.2; 455/509

(58) Field of Classification Search
USPC ................. 370/331, 343; 455/436, 450, 509
See application file for complete search history.

(56) References Cited

U.S. PATENT DOCUMENTS

| | | | | |
|---|---|---|---|---|
| 7,606,188 | B2 * | 10/2009 | Dale et al. | 370/321 |
| 2007/0010251 | A1 * | 1/2007 | Cho et al. | 455/436 |
| 2007/0087738 | A1 * | 4/2007 | Melkesetian | 455/422.1 |
| 2008/0095141 | A1 * | 4/2008 | Kong et al. | 370/345 |
| 2009/0285177 | A1 * | 11/2009 | Chin et al. | 370/331 |
| 2009/0318154 | A1 * | 12/2009 | Lee et al. | 455/438 |
| 2010/0323749 | A1 * | 12/2010 | Lee et al. | 455/524 |

* cited by examiner

*Primary Examiner* — Alpus H Hsu
*Assistant Examiner* — Yee Lam
(74) *Attorney, Agent, or Firm* — Schwegman Lundberg & Woessner, P.A.

(57) ABSTRACT

Overlay handover is generally presented. In this regard, a method is introduced including storing a broadband wireless network composite signal in a sample buffer, processing the sample buffer using subcarriers associated with a serving base station to determine a bandwidth grant from a first MAP, and reprocessing the sample buffer using subcarriers associated with a neighboring co-channel base station to determine a bandwidth grant from a second MAP. Other embodiments are also described and claimed.

21 Claims, 3 Drawing Sheets

OVERLAY HANDOVER IN A BROADBAND WIRELESS NETWORK

CLAIM OF PRIORITY

The present application claims priority to provisional application 61/134,188 filed on Jul. 7, 2008.

FIELD

Embodiments of the present invention may relate to the field of broadband wireless network handovers, and more specifically to an overlay handover in a broadband wireless network.

BACKGROUND

Broadband wireless handover (HO) is a key mobility feature that is especially important for voice and video services. Voice/Video performance is a very important factor in customer satisfaction and viability of the network business model. It is very important not to have significant transport data flow interruptions during the handover process.

BRIEF DESCRIPTION OF THE DRAWINGS

Embodiments of the present invention may become apparent from the following detailed description of arrangements, example embodiments, and the claims when read in connection with the accompanying drawings. While the foregoing and following written and illustrated disclosure focuses on disclosing arrangements and example embodiments of the invention, it should be clearly understood that the same is by way of illustration and example only and embodiments of the invention are not limited thereto.

The following represents brief descriptions of the drawings in which like reference numerals represent like elements and wherein.

DETAILED DESCRIPTION

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
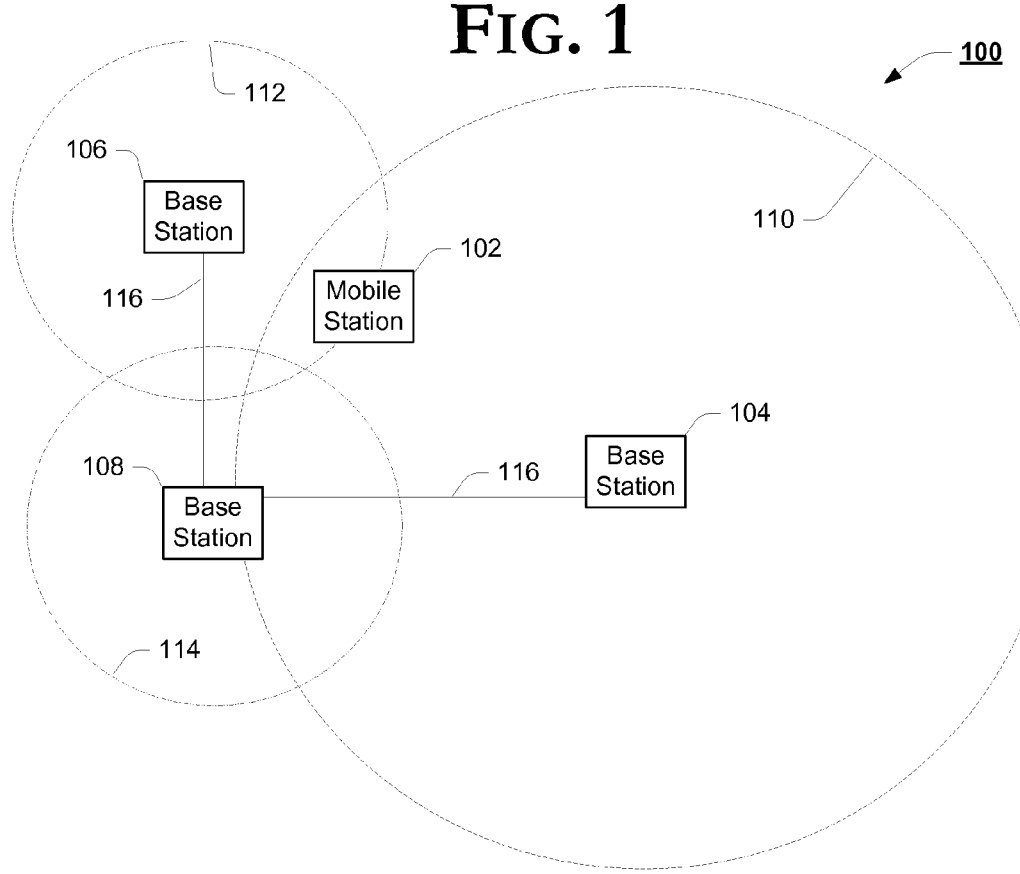
FIG. 1 is a block diagram of an example overlay wireless broadband network, in accordance with one example embodiment of the invention.

FIG. 1 is a block diagram of an example overlay wireless broadband network, in accordance with one example embodiment of the invention. Wireless broadband network 100 is intended to represent a broadband wireless network that supports mobile devices. In one embodiment, wireless broadband network 100 complies with a revision of the IEEE 802.16 standard, for example IEEE standard 802.16e-2005. In accordance with the illustrated example embodiment, wireless broadband network 100 may include one or more of mobile station 102, base stations 104, 106 and 108, base station ranges 110, 112 and 114, and network backbone 116 coupled as shown in FIG. 1.

Mobile station 102 represents any mobile device that connects to wireless broadband network 100. For example, mobile station 102 may represent, but it not limited to, a laptop, netbook, cell phone, mobile internet device, tablet, personal data assistant, etc, with wireless broadband capabilities and access. Mobile station 102 may travel with a user such that mobile station 102 becomes further away from some base stations and closer to other base stations.

Base stations 104, 106 and 108 provide wireless broadband network access to mobile stations, such as mobile station 102. Base stations 104, 106 and 108 may, for example, represent base stations with large antenna on tower, small antenna on buildings, or very small antenna in electronic devices. Base stations 104 may represent a macro-cell, with base stations 106 and 108 serving as overlay cells (such as relay, pico or femto cells), though the present invention is not so limited. In one embodiment, base stations 104, 106 and 108 share a single channel of bandwidth around a center frequency (intra-frequency-assignment or intra-FA) and operate with a frequency reuse of 3. In another embodiment, base station 104, 106 and 108 use separate channels of bandwidth around their individual center frequencies and operate in inter-frequency-assignment (inter-FA) deployment. Base stations 104, 106 and 108 may communicate with each other through network backbone 116, which may represent a wired network connection. In one embodiment, base stations 104, 106 and 108 communicate with each other over network backbone 116 to negotiate bandwidth access for mobile stations, for example as part of a handover as described in more detail hereinafter. Base stations 104, 106 and 108 may also know the location of neighboring base stations and may determine an appropriate base station to which to handover a mobile station based on data from the mobile station.

Base station ranges 110, 112 and 114 represent a signal range from base stations 104, 106, and 108, respectively. In one embodiment, base station ranges 110, 112 and 114 represent the range to which the associated base station provides acceptable signal strength, though the signals may be detectable at greater ranges. Though not shown, greater signal strengths may exist at ranges closer to the base stations.

Figure 2:
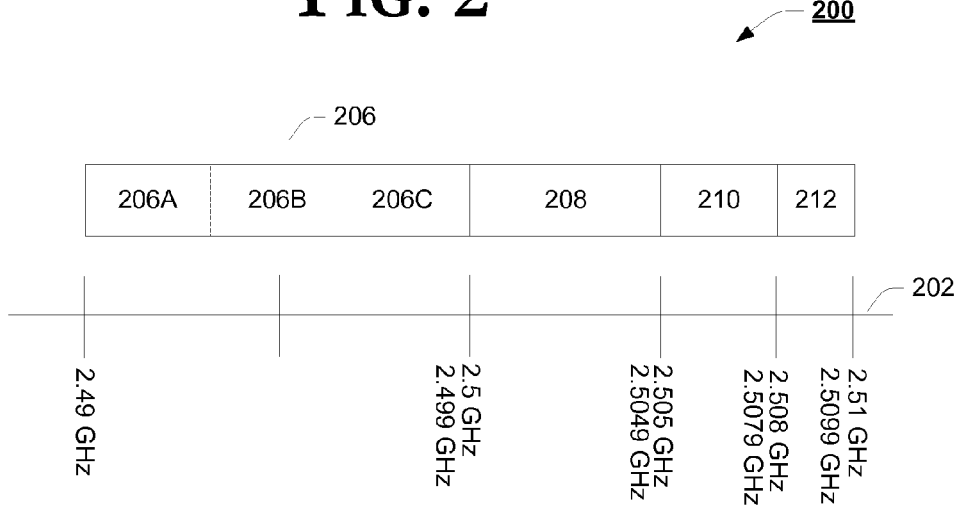
FIG. 2 is a block diagram of an example carrier frequency assignment, in accordance with one example embodiment of the invention.

FIG. 2 is a block diagram of an example carrier frequency assignment, in accordance with one example embodiment of the invention. Frequency assignment 200 may include spectrum 202, macro-cell subcarrier 206, relay-cell subcarrier 208, pico-cell subcarrier 210, and femto-cell subcarrier 212, as shown. Spectrum 202 represents the radiation frequencies used for wireless broadband network 100, and may be assigned by governmental agencies. While shown as being centered around 2.5 GHz with a bandwidth of 20 MHz, other frequencies and other bandwidths, for example less than 1 GHz or greater than 3 GHz, may be used. In one embodiment, subcarriers deployed in a same location as part of an inter-FA overlay may include macro-cell subcarrier 206, relay-cell subcarrier 208, pico-cell subcarrier 210, and femto-cell subcarrier 212, which may be associated with any of base stations 104, 106 and 108. In another embodiment, base stations 104, 106 and 108 may use fractions of macro-cell subcarrier 206 (i.e., subcarriers 206A, 206B and 206C) representing an intra-FA (or co-channel) overlay. Communication of the subcarriers used by the base stations may occur over network backbone 116.

Figure 3:
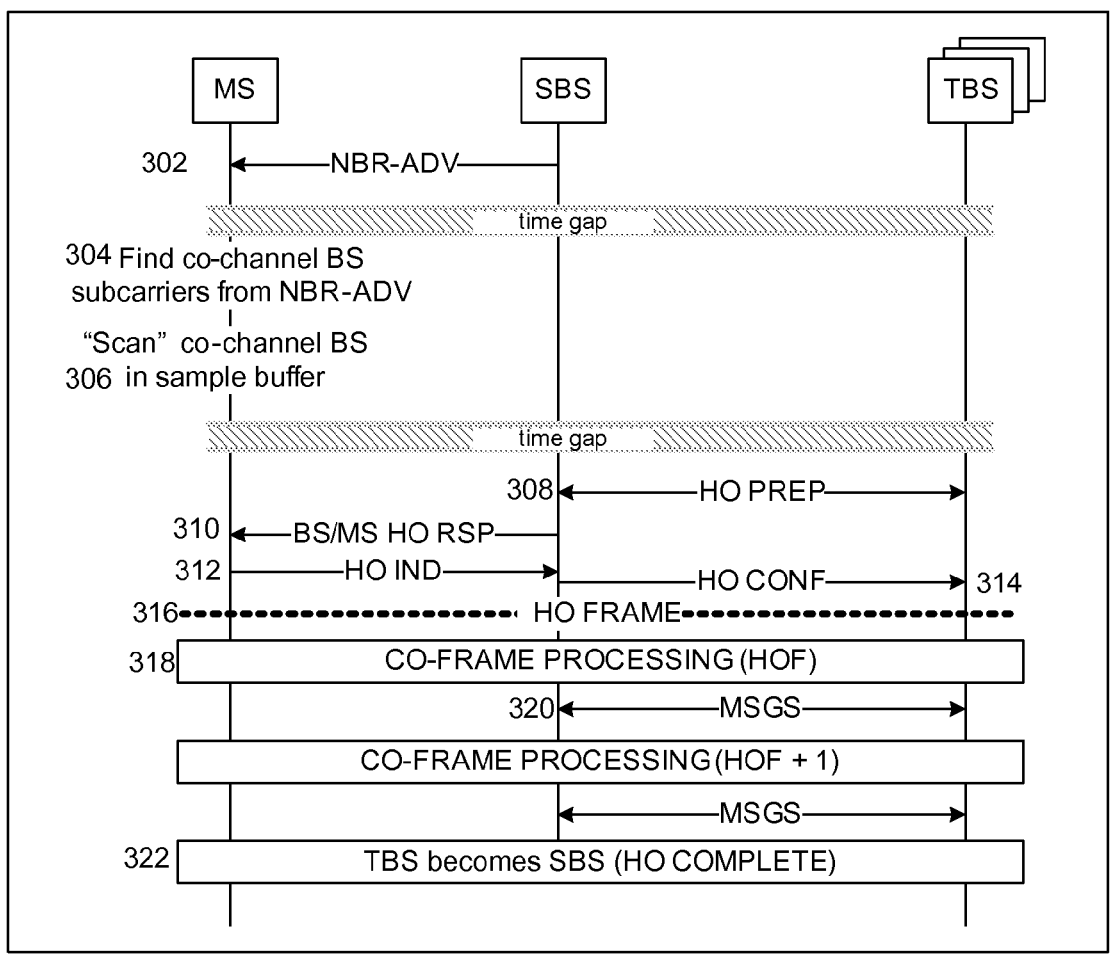
FIG. 3 is a flow diagram of an example interruption free overlay handover, in accordance with one example embodiment of the invention.

FIG. 3 is a flow diagram of an example interruption free overlay handover, in accordance with one example embodiment of the invention. In this example, mobile station 102 is currently being served by base station 104, but is moving toward base station 106, which could necessitate a handover. Flow 300 may start with mobile station 102 receiving (302) information about neighboring base stations 106 and 108 from serving base station 104. In one embodiment, serving base station 104 may provide mobile station 102 with subcarrier assignments for base stations 106 and 108. At some time, mobile station 102 may find (304) and perform scanning (306) to determine existence of co-channel base stations and to determine signal strength and quality. Mobile station 102 determines the existence of co-channel base stations 106 and 108 using the neighbor information from serving base station 104. In one embodiment a scan involves: mobile station 102 collects signal samples and processes using serving base station 104 subcarrier; mobile station 102 temporarily saves signal samples (enough for processing co-channel subcarriers); mobile station 102 re-processes signal samples using base station 106 (which may become target base station, TBS) subcarrier; mobile station 102 determines signal strength and quality; mobile station 102 re-processes signal samples using base station 108 subcarrier; mobile station 102 determines signal strength and quality. During this scan processing, mobile station 102 (MS) continues to process the serving base station 104 (SBS) frame as usual.

Handover (HO) is triggered either by the MS or the SBS. For MS-initiated HO, MS determines the possibility of an overlay handover based on scanning. For BS-initiated HO, SBS determines the possibility of an overlay handover using the scan results provided by the MS. SBS negotiates (308) with one or more TBSs for HO start frame, MS identification update, and pre-allocated SBS/TBS bandwidth grants for MS. For intra-FA overlay HO, The SBS and TBS may agree on non-overlapping uplink bandwidth allocations, while downlink bursts may or may not overlap. For inter-FA overlay HO, both downlink bursts and uplink bandwidth allocations may or may not overlap. There are options for MS resource grants during HO depending on MS capabilities. For intra-FA overlay HO, MS co-frame processing is required for overlap downlink bursts. For inter-FA overlay HO, MS dual radio co-frame processing is required for overlap downlink/uplink bursts. In one embodiment, if the MS is capable of processing both the SBS and TBS DL-MAP and UL-MAP in time to receive and transmit to the SBS and TBS (as shown in FIG. 4), then dynamic bandwidth grants (specified in MAPs) can be used, otherwise bandwidth grants during HO may be static (specified before HO).

SBS then sends (310) a handover response to MS. MS then sends (312) HO-IND message to SBS and SBS sends (314) HO confirmation to TBS. HO then starts (316). Co-frame processing (318) and SBS/TBS messaging (320) may be repeated several times before HO is complete (322) and TBS (106) becomes the serving base station.

Figure 4:
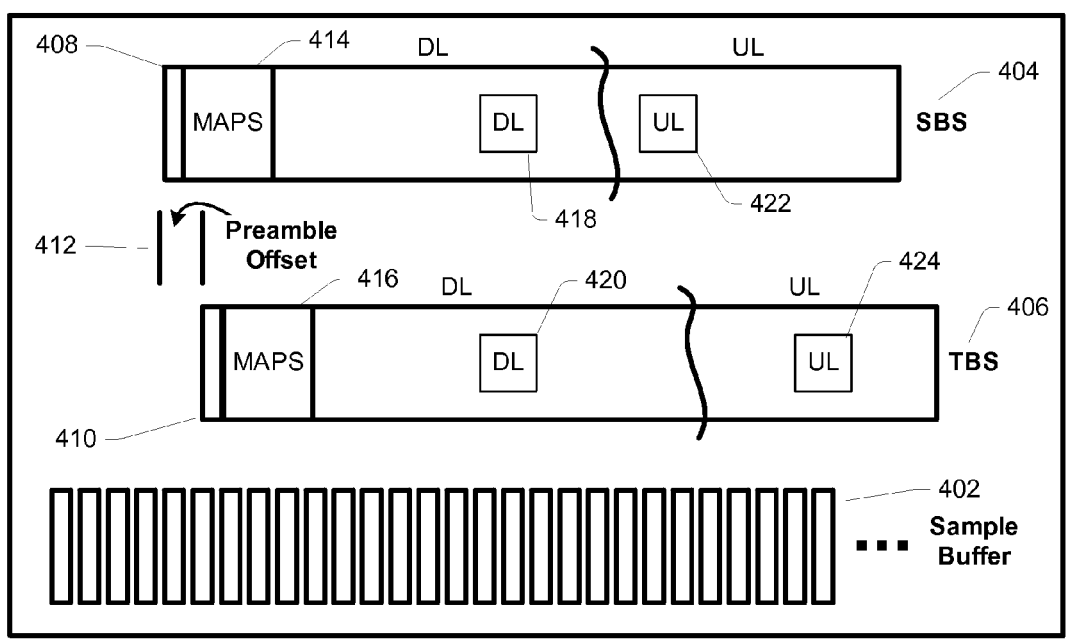
FIG. 4 is a block diagram of an example co-frame processing, in accordance with one example embodiment of the invention.

FIG. 4 is a block diagram of an example co-frame processing, in accordance with one example embodiment of the invention. Composite signal 400 includes MS sample buffer 402, SBS frame 404, TBS frame 406, SBS preamble 408, TBS preamble 410, preamble offset 412, SBS MAPS 414, TBS MAPS 416, MS SBS downlink 418, MS TBS downlink 420, MS SBS uplink 422 and MS TBS uplink 424. An MS receives a composite signal composed of the signal from the Serving Base Station (SBS), i.e. SBS frame 404, and signals from neighboring BSs, i.e. TBS frame 406, on the co-channel and stores them in MS sample buffer 402, which may be processed iteratively to extract data from both SBS frame 404 and TBS frame 406.

Mobile station 102 may use subcarrier information previously received to find TBS preamble 410, which may be separated in time from SBS preamble 408 by preamble offset 412. Mobile station 102 may then read SBS MAPS 414 and TBS MAPS 416 to determine the bandwidth grants of MS SBS downlink 418, MS TBS downlink 420, MS SBS uplink 422 and MS TBS uplink 424. MS SBS uplink 422 and MS TBS uplink 424 would have been previously negotiated by SBS and TBS to be non-overlapping. In this way MS could receive downlink from and send uplink to both SBS and TBS in a same frame. In one embodiment, as part of a handover process mobile station 102 may send transport data to base station 104 and control information to base station 106 within a same frame. In another embodiment, mobile station 102 may concurrently send and/or receive transport data to/from both base station 104 and base station 106.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. An apparatus comprising:
a broadband wireless network mobile station to receive a composite signal that includes information about a plurality of neighboring target base stations in frames from a serving base station, to process the frames from the serving base station using a subcarrier of the serving base station to obtain subcarriers being used by neighboring target base stations, to collect signal samples from the neighboring target base stations using a subcarrier of the serving base station and the information received about the neighboring target base stations, to store the signal samples of the neighboring target base stations in a sample buffer and to process the sample buffer by changing a subcarrier frequency to iteratively process each of the signal samples from the neighboring target base stations by processing the sample buffer to extract frame data received from a first of the plurality of neighboring target base stations using a first subcarrier for the first of the plurality of neighboring target base stations; and
re-processing the sample buffer to extract frame data received from a second of the plurality of neighboring target base stations using a second subcarrier for the second of the plurality of neighboring target base stations;
wherein the processing and the re-processing the sample buffer are iteratively performed while continuing to process frames from the serving base station using the subcarrier of the serving base station.

2. The apparatus of claim 1, wherein the mobile station continues to process the serving base station frame and wherein the mobile station uses at least one channel centered on a center frequency to the plurality of neighboring target base stations and determines signal strength and quality associated with the plurality of neighboring target base stations, wherein the serving base station frame comprises a signal from the serving base station provided using a serving base station subcarrier and the neighboring target base station frames comprises signals from each of the plurality of neighboring target base stations provided using subcarrier assignments for each of the plurality of neighboring target base stations.

3. The apparatus of claim 2, wherein the mobile station initiates an overlay handover based on the determined signal strength and quality associated with the neighboring target base station.

4. The apparatus of claim 2, wherein the mobile station provides the determined signal strength and quality to the serving base station for enabling the serving base station to initiate an overlay handover.

5. The apparatus of claim 1, wherein the mobile station processes a single channel of bandwidth around a center frequency shared by the serving base station and the plurality of neighboring target base stations when operating in an intra-frequency-assignment mode.

6. The apparatus of claim 1, wherein the mobile station processes separate channels of bandwidth for the serving base station and the plurality of neighboring target base stations when operating in an inter-frequency-assignment deployment.

7. The apparatus of claim 1, wherein the subcarrier assignment comprises a subcarrier selected from the group consisting of macro-cell subcarrier, relay-cell subcarrier, pico-cell subcarrier, and femto-cell subcarrier.

8. The apparatus of claim 7, wherein the serving base station and the plurality of neighboring target base stations use fractions of a macro-cell subcarrier for an intra-frequency assignment overlay.

9. An apparatus comprising:
a broadband wireless network serving base station, the serving base station providing a composite signal that includes information about a plurality of neighboring target base stations in frames to a mobile station, wherein the composite signal provides signal samples from the neighboring target base stations using a subcarrier of the serving base station and the information received about the neighboring target base stations, the mobile station via the signal samples of the neighboring target base stations being stored in a sample buffer that is processed by extracting, from the sample buffer, frame data from the serving base station using changing a subcarrier frequency to iteratively process each of the signal samples of the neighboring target base stations by processing the sample buffer to extract frame data received from a first of the plurality of neighboring target base stations using a first subcarrier for the first of the plurality of neighboring target base stations; and
re-processing the sample buffer to extract frame data received from a second of the plurality of neighboring target base stations using a second subcarrier for the second of the plurality of neighboring target base stations;
wherein the processing and the re-processing the sample buffer are iteratively performed while frames from the serving base station are continuously provided to the mobile station for processing using the subcarrier of the serving base station.

10. The apparatus of claim 9, wherein the serving base station communicates with the plurality of neighboring target base stations through a network backbone, the serving base station frame comprising a signal from the serving base station provided using a serving base station subcarrier and the neighboring target base station frames comprises signals from each of the plurality of neighboring target base stations provided using subcarrier assignments for each of the plurality of neighboring target base stations.

11. The apparatus of claim 9, wherein the serving base station and the plurality of neighboring target base stations use non-overlapping uplink bandwidth allocations for intra-frequency assignment overlay handoff.

12. The apparatus of claim 9, wherein the serving base station and the plurality of neighboring target base stations use non-overlapping uplink and downlink bandwidth allocations for inter-frequency subcarrier assignment overlay handoff.

13. The apparatus of claim 9, wherein the serving base station and the plurality of neighboring target base stations use overlapping uplink and downlink bandwidth allocations for inter-frequency subcarrier assignment overlay handoff.

14. The apparatus of claim 9, wherein the serving base station operates with a frequency reuse scheme.

15. The apparatus of claim 9, wherein the serving base station triggers a handover of the mobile station to one of the plurality of neighboring target base stations.

16. The apparatus of claim 9, wherein the serving base station provides transport data to the mobile station while the mobile station performs control signaling with one of the plurality of neighboring target base stations.

17. A method, comprising:
receiving, at a mobile station, a composite signal that includes information about a plurality of neighboring target base stations from a serving base station;
processing, at the mobile station, frames from serving base station using a subcarrier of the serving base station to obtain subcarriers being used by the plurality of neighboring target base stations,
collecting signal samples from the neighboring target base stations using a subcarrier of the serving base station and the information received about the neighboring target base stations;
storing the signal samples of the neighboring target base stations in a sample buffer; and
processing the sample buffer by changing a subcarrier frequency to iteratively process each of the signal samples from the plurality of neighboring target base stations by:
processing the sample buffer to extract frame data received from a first of the plurality of target base stations using a first subcarrier for the first of the plurality of neighboring target base stations; and
re-processing the sample buffer to extract frame data received from a second of the plurality of neighboring target base stations using a second subcarrier for the second of the plurality of neighboring target base stations;
wherein the processing and the re-processing the sample buffer are iteratively performed while continuing to process frames from the serving base station using the subcarrier of the serving base station.

18. The method of claim 17, further comprising using, by the mobile station, at least one channel centered on a center frequency, identifying, by the mobile station, neighboring target base stations, scanning, by the mobile station, to determine signal strength and quality associated with the plurality of neighboring target base stations and coordinating with the serving base station and one of the plurality of neighboring target base stations to ensure the bandwidth grants for a same mobile station are not overlapping.

19. The method of claim 17, wherein the receiving, at the mobile station, subcarrier assignments further comprises receiving subcarriers selected from the group consisting of macro-cell subcarrier, relay-cell subcarrier, pico-cell subcarrier, and femto-cell subcarrier.

20. The method of claim 17, wherein the receiving, at the mobile station, subcarrier assignments further comprises receiving fractions of a macro-cell subcarrier for use by the serving base station and the plurality of neighboring target base stations to provide an intra-frequency assignment overlay.

21. The method of claim 17 further comprising initiating, by the mobile station, an overlay handover based on the determined signal strength and quality associated with the neighboring target base station.

\* \* \* \* \*